(12) United States Patent
Grödl et al.

(10) Patent No.: US 10,474,169 B2
(45) Date of Patent: Nov. 12, 2019

(54) PROPORTIONAL VALVE

(71) Applicant: HOERBIGER AUTOMATISIERUNGSTECHNIK HOLDING GMBH, Altenstadt (DE)

(72) Inventors: Marcus Grödl, Altdorf (DE); Jochen Schaible, Altensteig (DE); Daniel Haller, Stuttgart (DE); Collin Dymel, Stuttgart (DE); Benedikt Hildebrandt, Filderstadt (DE); György Molnar, Waldenbuch (DE); Sebastian Neiss, Stuttgart (DE)

(73) Assignee: HOERBIGER FLOW CONTROL GMBH, Altenstadt (DE)

( * ) Notice: Subject to any disclaimer, the term of this patent is extended or adjusted under 35 U.S.C. 154(b) by 0 days.

(21) Appl. No.: 16/058,211

(22) Filed: Aug. 8, 2018

(65) Prior Publication Data

US 2018/0348801 A1 Dec. 6, 2018

Related U.S. Application Data

(63) Continuation of application No. PCT/EP2017/052977, filed on Feb. 10, 2017.

(30) Foreign Application Priority Data

Feb. 11, 2016 (DE) .................... 10 2016 102 388.4

(51) Int. Cl.
*G05D 16/20* (2006.01)
*F16K 31/42* (2006.01)
(Continued)

(52) U.S. Cl.
CPC ..... *G05D 16/2093* (2013.01); *F15B 13/0405* (2013.01); *F15B 13/0431* (2013.01);
(Continued)

(58) Field of Classification Search
CPC ......... Y10T 137/8225; Y10T 137/8242; Y10T 137/86582–86614; Y10T 137/8704;
(Continued)

(56) References Cited

U.S. PATENT DOCUMENTS 1,467,417 A * 9/1923 Beckwith .............. F16K 31/363
251/33
1,802,324 A * 4/1931 Bartlett .................... B67D 7/16
222/373

(Continued)

FOREIGN PATENT DOCUMENTS

DE 19504364 A1 8/1996
DE 19904901 A1 8/2000
(Continued)

OTHER PUBLICATIONS

International Search Report issued for corresponding International Application No. PCT/EP2017/052977 dated May 3, 2017.

*Primary Examiner* — William M Mccalister
(74) *Attorney, Agent, or Firm* — Myers Wolin, LLC

(57) ABSTRACT

A proportional valve is provided having a pilot control valve that can be controlled by means of a control signal and having a booster valve that can be actuated by means of the pilot control valve. The proportional valve has a compressed-air connection for connecting a compressed-air supply, a working connection, and an air-removal connection. The booster valve has three valve elements, which are arranged one after the other and can each be moved in an axial direction against a spring force.

11 Claims, 3 Drawing Sheets

(51) Int. Cl.
*F15B 13/043* (2006.01)
*F16K 11/10* (2006.01)
*F15B 13/04* (2006.01)
*G05D 16/10* (2006.01)

(52) U.S. Cl.
CPC ............ *F16K 11/10* (2013.01); *F16K 11/105* (2013.01); *F16K 31/423* (2013.01); *G05D 16/101* (2019.01); *G05D 16/2097* (2019.01); *F15B 13/0438* (2013.01); *F15B 2013/0409* (2013.01); *Y10T 137/8242* (2015.04); *Y10T 137/86614* (2015.04); *Y10T 137/8704* (2015.04); *Y10T 137/87209* (2015.04)

(58) Field of Classification Search
CPC ..... Y10T 137/87193; Y10T 137/87201; Y10T 137/87209; G05D 16/2093; G05D 16/2097; G05D 16/101; F15B 13/0405; F15B 13/0431; F15B 13/0409; F15B 13/0438; F16K 11/10; F16K 11/105; F16K 31/423
USPC ...... 137/553, 596.14–596.16, 625.6–625.64, 137/630.22
See application file for complete search history.

(56) References Cited

U.S. PATENT DOCUMENTS

| | | | | |
|---|---|---|---|---|
| 2,850,330 A | | 9/1958 | Andrews | |
| 3,403,699 A | * | 10/1968 | Fites | B60T 13/141 137/627.5 |
| 3,430,437 A | * | 3/1969 | Bettoni | F01N 3/22 60/290 |
| 3,447,555 A | * | 6/1969 | Jenney | F15B 5/003 137/82 |
| 3,552,433 A | * | 1/1971 | Mason | F15B 20/008 137/553 |
| 4,108,205 A | * | 8/1978 | Hawley | F16K 11/044 137/554 |
| 4,798,223 A | * | 1/1989 | Mitchell | F16K 1/44 137/312 |
| 5,819,783 A | * | 10/1998 | Blatt | F15B 1/02 137/271 |
| 6,050,081 A | * | 4/2000 | Jansen | F02C 7/232 137/112 |
| 6,199,585 B1 | * | 3/2001 | Reith | F15B 13/0402 137/554 |
| 6,220,284 B1 | * | 4/2001 | Hayashi | F15B 13/0402 137/554 |
| 6,427,720 B1 | * | 8/2002 | Hayashi | F15B 13/0402 137/554 |
| 6,619,615 B1 | | 9/2003 | Mayr et al. | |
| 6,830,066 B1 | * | 12/2004 | Madden | F16K 31/423 137/554 |
| 2003/0234050 A1 | * | 12/2003 | Misumi | F15B 13/0402 137/554 |
| 2008/0308163 A1 | * | 12/2008 | Larsen | F16K 11/044 137/625.48 |
| 2009/0309052 A1 | | 12/2009 | Kresse et al. | |
| 2011/0193000 A1 | * | 8/2011 | Miyazoe | F15B 11/064 251/129.01 |
| 2013/0087223 A1 | * | 4/2013 | Ozzello | F15B 13/0436 137/551 |
| 2013/0186098 A1 | * | 7/2013 | Paradise | F02C 7/232 60/776 |
| 2015/0177740 A1 | | 6/2015 | Haller et al. | |
| 2015/0177741 A1 | | 6/2015 | Haller et al. | |

FOREIGN PATENT DOCUMENTS

| | | |
|---|---|---|
| DE | 102012017713 A1 | 3/2014 |
| DE | 102012017714 A1 | 3/2014 |
| EP | 2237128 A1 | 10/2010 |

* cited by examiner

PROPORTIONAL VALVE

CROSS REFERENCE TO RELATED APPLICATIONS

This application is a continuation under 35 U.S.C. § 120 of International Application PCT/EP2017/052977, filed Feb. 10, 2017, which claims priority to German Application No. 10 2016 102 388.4, filed Feb. 11, 2016, the contents of each of which are incorporated by reference herein.

FIELD OF THE INVENTION

The present invention relates to a proportional valve with a pilot valve that can be activated by a control signal and a booster valve that can be actuated by means of the pilot valve, wherein the proportional valve has a compressed-air port for connection of a compressed-air supply, a working port and a vent port.

BACKGROUND

Such proportional valves, which are used in particular for actuation of a pneumatic fitting, a pneumatic drive or other pneumatic actuator, are known in diverse forms from the prior art.

In the capacity of a proportional valve, it must be suitable for making available, at the working port provided for connection of the pneumatic fitting, a (an air) pressure that can be regulated as precisely as possible. For this purpose, various valve positions are typically approached by appropriate actuation of the valve by means of the pilot valve, in order optionally to couple the working port fluidically with the compressed-air supply or with the vent or—in order to maintain a pressure prevailing at a working port—to decouple it from both. In this connection, intermediate positions between complete air admission and complete venting of the fitting connected to the working port should also be possible in the capacity of a proportional valve.

Proportional valves of the type mentioned in the foregoing are relatively complex in their design and their operation.

In this connection, the prior art frequently utilizes so-called slide valves, in which at least one linearly displaceable valve element, depending on its position, either opens or closes (completely or partly) an opening disposed laterally relative to the valve element and influencing the flow of air. In contrast to poppet valves, however, for lack of a sealing seat that effectively blocks the flow of fluid, detrimental leakage, which the present disclosure aims advantageously to keep as small as possible or to prevent entirely, must always be expected here for precise application situations.

Beyond this, a proportional valve of the class in question is already known from DE 10 2012 017 713 A1. It has the form of a position controller, in which a power stage (=booster valve) actuated by a pilot valve comprises, as a pressure-displacement transducer, two spring-preloaded poppet valves, which are pressurized from a common control chamber and which are sequentially actuated in order to establish various switched states upon increase of the pressure prevailing in the control chamber. Because of the poppet valves to be disposed therein on various sides of the common control chamber, the position controller described in DE 10 2012 017 713 A1 needs a not inconsiderable installation space, which the present disclosure intends to reduce.

In connection with the activation, by a regulating system, of proportional valves configured as poppet valves, it must be considered that—depending on the specific design of the valve—relatively complex characteristics may then result. This is true in particular when the control pressure needed for actuation of the booster valve depends on the instantaneous working pressure at the working outlet of the valve. Furthermore, if a piezoelectric pilot valve is being used, the relationship between the control signal and the pilot pressure generated by the pilot valve may develop hysteresis, which is then imposed on the characteristic of the valve as a whole.

From U.S. Pat. No. 2,850,330, a valve group provided for use in a brake system for tractors with trailers is known in which, by realization of two valves, three valve elements in total are provided that are connected in series, are respectively movable in an axial direction and are positionable in cascade-like manner. By means of the first valve, it is now optionally possible to vent a first working port for the brake system of the trailer or optionally to place it in communication with a compressed-air port on the tractor side, while by means of the second valve it is optionally possible to vent a second emergency working port for the brake system of the trailer or to place it in communication with a second emergency compressed-air port on the tractor side. During variation of the position of the first valve element, a transition takes place there from a first switched state, in which the respective working port is vented, respectively to a second switched state, in which the respective working port is in communication with the compressed-air port on the tractor side.

SUMMARY

Against this background, it is an object of the present disclosure to provide an improved proportional valve of the type mentioned in the introduction, which in particular needs the smallest possible (lateral) installation space and at the same time can be operated reliably and precisely in a particularly simple manner.

This object is achieved by a proportional valve. Preferred configurations of such a valve will become apparent from the claims and the description hereinafter.

The proportional valve is characterized, besides the features mentioned in the introduction, in that the booster valve has three valve elements connected in series and respectively movable in an axial direction against a spring force, namely a first valve element actuated by the pilot valve, a second valve element, which is actuated by the first valve element, and a third valve element, which is actuated by the second valve element, wherein, in a basic position of the proportional valve, the first, the second and the third valve elements are spaced apart from one another in pairs and, within the booster valve, a first sealing seat acting between the first valve element and the second valve element and a second sealing seat acting between the third valve element and the housing are formed and disposed in such a way that, during variation of the control signal (with which the switched state of the pilot valve and thus the pilot pressure generated by the pilot valve is changed) that activates the pilot valve and of the resulting cascade-like positioning of the axial positions of the first, second and third valve elements, various switched states can be set for venting of and air admission to the working port and for holding a pressure present at the working port. Finally, it is also provided according to this disclosure that a position sensor is provided to detect the axial position of the first valve element and that a control unit of the proportional valve is set up in such a way that the measured signal of the position sensor is evaluated for calculation of the control signal for the pilot valve, needed in order to achieve a desired switched state of the booster valve.

In contrast to the prior art already mentioned in the foregoing, within the scope of the present disclosure it is therefore not two poppet valves as components of one pressure-displacement transducer each that are actuated by the pressure in a common control chamber, but instead it is cascade-like positioning of the valve elements influencing the fluid flow within the valve that takes place in the present case, because of the fact that the first valve element is actuated by the pilot valve and the valve elements connected downstream from the first valve element are actuated successively—in particular purely mechanically—by the respective upstream valve element. It is evident that, by virtue of the axial direction of actuation for all three valve elements, the installation space needed for a valve—especially in a direction situated laterally relative to the axial direction of movement of the valve elements—can be particularly compact.

Furthermore, in view of the circumstance that two sealing seats interacting with respectively at least one valve element are realized within the valve, particularly low-leakage or leak-free operation can be assured, which is of great advantage in particular for holding a pressure prevailing at the working port and which keeps the pneumatic energy consumption of the valve at a minimum. Despite the hysteresis effects that develop hereby, which will be explained in more detail hereinafter in connection with the description of the figures, a described valve can be operated simply with particularly high regulation quality by using the position sensor provided according to the disclosure.

As an example, the control signal that activates the pilot valve may be a control voltage, although obviously the use of other kinds of control signals (e.g. in the form of PWM signals) may also be considered.

The measured signal of a position sensor, which detects the axial location or position of the first valve element, i.e. the valve stroke, is evaluated for calculation of the variation of the control signal for the pilot valve, needed in order to achieve or maintain a desired switched state of the booster valve. In this context, despite a relatively complex (in the sense of regulating systems) valve structure with cascade-like positioning of at least three spring-preloaded valve elements, it is found that the valve as a whole can be activated in particularly simple manner. This is possible because, in the valve, the switched state specifically assumed by the valve as a whole is ultimately determined (exclusively) by the instantaneous position of the first valve element. When the position of the first valve element has been determined, the essential information on the instantaneous switched state of the valve is therefore available.

During calculation of the respectively needed control signal (i.e., of the control voltage to be newly set for the pilot valve, for example), obviously the control unit of the proportional valve preferably utilizes values, saved appropriately in a memory unit, with which the valve state of the booster valve respectively achieved hereby is assigned to a specified axial position of the first valve element (or to the measured signal of the position sensor corresponding thereto).

In principle, it is possible, within the scope of the disclosure to utilize a purely mechanical position sensor. It proves to be particularly advantageous, however, when the position sensor is set up for contactless measurement of the axial position of the first valve element. In this context, it is possibly to provide in a particularly expedient configuration that the position sensor is based on an optical, capacitive or magnetic measurement principle.

In this context, the use of a magnetic-field angle sensor, which advantageously can be configured as an AMR, TMR or GMR sensor, proves particularly advantageous.

AMR sensors use the so-called anisotropic magnetoresistance (=AMR) effect. TMR and GMR sensors use magnetic tunnel resistance (English: tunneling magnetoresistance=TMR) or so-called giant magnetic resistance (English: giant magnetoresistance=GMR). Since sensors operating on these principles are sufficiently known on the basis of the prior art and are commercially available, there is no need here for a more extensive explanation of the various measurement principles. What is decisive in the context of the present disclosure is that particularly highly precise measured results can be obtained with high energy efficiency using the sensor types mentioned in the foregoing.

As already hinted at in the foregoing, it is possible in a particularly preferred configuration of the valve to provide that the control unit of the proportional valve is set up in such a way that the control signal for the pilot valve, needed in order to achieve a desired switched state of the booster valve, is calculated with exclusive utilization of the measured signal of the position sensor. In other words, such a valve can therefore be operated advantageously in such a way that no measured signals other than those of the position sensor are needed for highly precise activation of the valve.

For the specific configuration of the valve, it may be advantageously provided that the first valve element is formed by a diaphragm disk with a diaphragm-disk shank that extends in axial direction and is provided with an axial bore. The second valve element may be formed advantageously by a valve tappet, which is spring-preloaded in a direction pointed toward the diaphragm disk and is provided on an end face pointing toward the diaphragm-disk shank with a first sealing seat for the free end of the diaphragm-disk shaft, which can be brought into contact therewith. The third valve element may be formed advantageously by a base element, which is spring-preloaded against a second sealing seat in a direction pointing toward the valve tappet and can be lifted from the second sealing seat by axial displacement of the valve tappet that has been brought into contact on the base element. Hereby a particularly compact valve structure can be achieved, as will be explained in more detail hereinafter on the basis of an exemplary embodiment of the present valve.

Since a position sensor based on a magnetic measurement principle must obviously interact with a magnetic element provided appropriately on the first valve element in order to measure the axial position of the first valve element, it may be provided, in a preferred configuration of the valve, that the position sensor interacts with a magnetic element integrated in the diaphragm disk.

In yet another preferred improvement of the present valve, it may be provided that a surface forming the first and/or second sealing seat and/or interacting therewith for fine regulation of the fluid flow is made of a polymer material, especially having elastic behavior, optionally different from that of the respective sealing partner. Hereby particularly fine transitions can be achieved with respect to the intermediate positions of the proportional valve, needed for proportional operation of the valve.

From the viewpoint of a switching system, it may finally be provided preferably that the pilot valve, which may advantageously be a piezoelectric pilot valve, is a 3/2 way valve. The booster valve may be advantageously configured as a 3/3-way valve.

BRIEF DESCRIPTION OF THE DRAWING

An exemplary embodiment of an inventive valve will be explained in more detail hereinafter on the basis of the drawing, wherein.

DETAILED DESCRIPTION OF THE PREFERRED EMBODIMENTS

Figure 1:
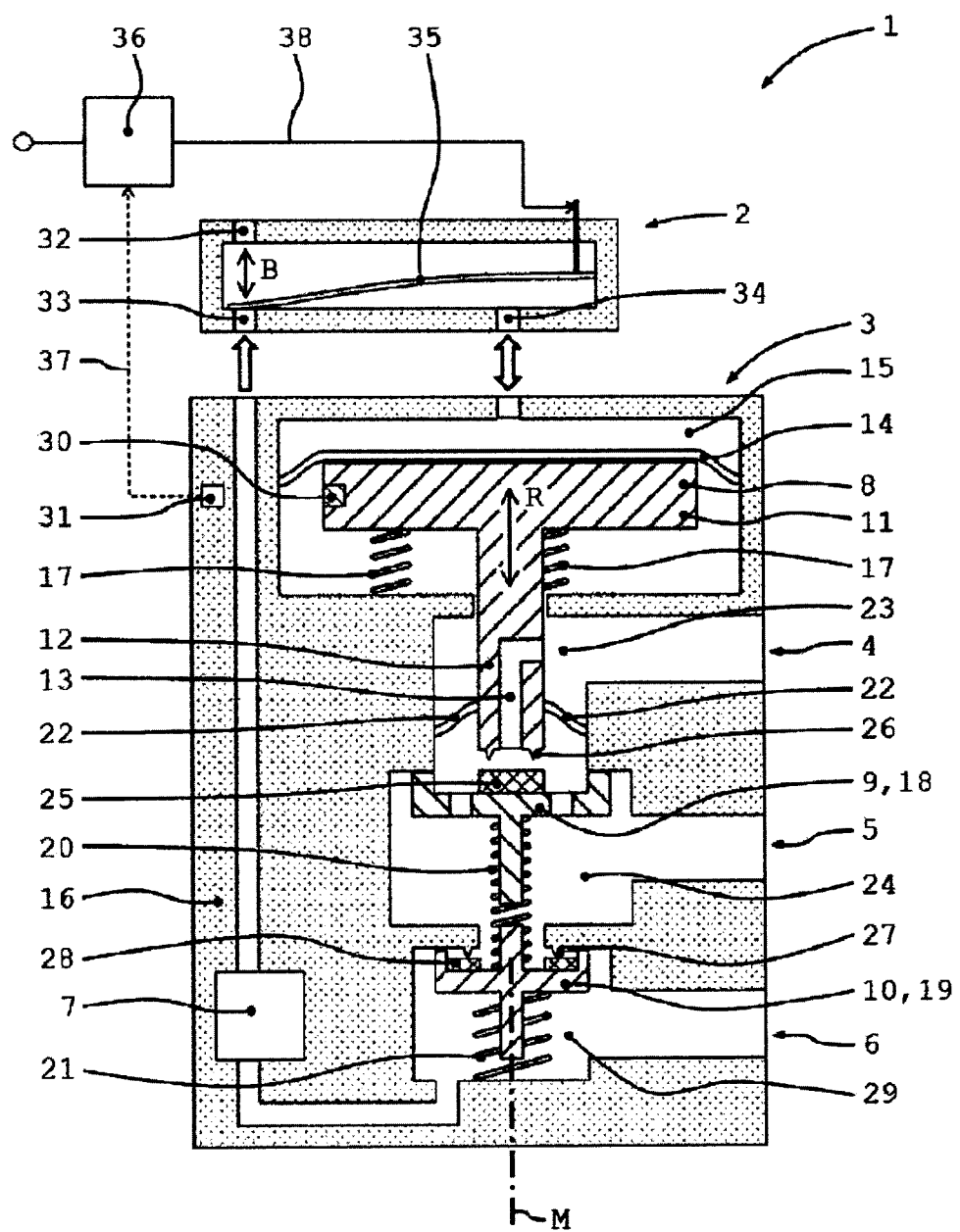
FIG. 1 shows a schematic view of a proportional valve and its components.

FIG. 1 shows an exemplary embodiment of an inventive proportional valve 1, which has a pneumatic, piezoelectric pilot valve 2 as preliminary stage and a booster valve 3 as power stage.

Valve 1 further has a vent port 4, a working port 5 for connection of a pneumatic fitting (not illustrated) to be actuated with valve 1 and a port 6 for a compressed-air supply with a predetermined air pressure of 8 bar, for example. Furthermore, a pressure regulator 7 is provided, with which a pressure of 1.2 bar, for example, which is lower than the pressure prevailing for the compressed-air supply at port 6, can be drawn therefrom as input pressure for pilot valve 2 provided for actuation of booster valve 3.

Valve 1 further has three valve elements 8, 9, 10 connected in series and respectively movable in an axial direction according to double arrow R.

In this connection, first valve element 8 (topmost in FIG. 1) comprises a diaphragm disk 11 and a diaphragm-disk shank 12 with an axial bore 13.

Diaphragm disk 11 is in operative connection (via a mechanical coupling in the present case) with a first diaphragm 14, wherein a control pressure chamber 15 is formed above first diaphragm 14 and diaphragm-disk 11. The air pressure prevailing in control pressure chamber 15 is generated via pilot valve 2.

Furthermore, first valve element 8 (formed by diaphragm disk 11 plus diaphragm-disk shank 12) is spring-preloaded in (axial) direction relative to control pressure chamber 15. For this purpose, in total three spring elements (springs) 17 braced on housing 16 of valve 1 are provided in the present exemplary embodiment. Only one of those (left of center axis M) lies in the section plan in FIG. 1, while the other two spring elements 17 (of which only one is visible in FIG. 1) lie in front of or behind the section plane. These three spring elements 17 are respectively disposed equidistant (i.e. with the same radial spacing) from center axis M, and in the plane passing perpendicularly through center axis M are offset, in pairs, by the same angle α of 120° relative to one another (i.e. around center axis M), so that, relative to the axial center axis M, completely symmetric preloading of first valve element 8 in the direction of control pressure chamber 14 is achieved.

Second valve element 9 in the present case is formed by a valve tappet 18 and third valve element 10 by a base element 19. In this connection, valve tappet 18 is preloaded in the direction of first valve element 8 (=diaphragm disk 11 and diaphragm-disk shank 12) by means of a spring 20, which is braced on base element 19, while base element 19 in turn is preloaded by means of a spring 21, which is braced on housing 16.

In the basic position of valve 1 illustrated in FIG. 1, all three axially movable valve elements 8, 9, 10 of booster valve 3 are preloaded in the same direction, but are spaced apart from one another in pairs.

Diaphragm-disk shank 12 is coupled with a second diaphragm 22, which circumferentially surrounds diaphragm-disk shank 12 sealingly and separates (continuously vented) vent chamber 23, which is disposed between first diaphragm 14 and second diaphragm 22 and which leads to vent port 4, from a working pressure chamber 24 leading to working port 5. This second diaphragm 22 may serve simultaneously as radial bearing of diaphragm shank 12. By virtue of the spacing present between the free end of diaphragm-disk shank 12 and valve tappet 18 in the basic position of valve 1, working pressure chamber 24 (and thus also a pneumatic fitting connected to working port 5) is vented in the valve position illustrated in FIG. 1.

At its top face pointing toward diaphragm-disk shank 12, valve tappet 18 has a polymer material, which serves sealing face 25 and on which a lower edge 26 of diaphragm-disk shank 12 can come into contact to form a first sealing seat. Depending on the hardness of the polymer, this compliant sealing face permits particularly precise proportional fine regulation during positioning of the valve in the vicinity of the contact area.

When therefore—by appropriate increase of the pressure prevailing in control pressure chamber 15 by means of pilot valve 2, which in turn can be activated by an (electric) control voltage—first valve element 8 is pushed so far that lower edge 26 of diaphragm-disk shank 12 comes sealingly into contact on top face 25 of valve tappet 18, the communication through axial bore 13 of diaphragm-disk shank 12 that existed between vent chamber 23 and working pressure chamber 24 is blocked, whereby the previous venting of working pressure chamber 24 is canceled.

A second sealing seat is formed in the illustrated exemplary embodiment of a proportional valve 1 by a sealing edge 27, which is integral with the housing and in FIG. 1 is pointing downward, and against which base element 19 functioning as third valve element 10 is preloaded by means of spring 21, wherein here a sealing face 28 of a polymer material, interacting with sealing edge 27 to form the second sealing seat, is provided in turn on the base-element side. A pressure supply chamber 29 in communication with port 6 for the pressure supply is situated underneath the second sealing seat, and is therefore separated fluidically from working pressure chamber 24 precisely when base element 19 bears sealingly with its top face on sealing edge 27, as is the case in the illustrated basic position.

Thus, only when—by suitable actuation of first valve element 8 by means of pilot valve 2—first valve element 8 has been pushed so far that first valve element 8 bears on second valve element 9 and second valve element 9 bears on third valve element 10, does a further increase of the control pressure in control pressure chamber 15 cause third valve element 10 (=base element 19) to be lifted from the second sealing seat, whereby working pressure chamber 24 is placed fluidically in communication with pressure supply 6, i.e. the pressure at working outlet 5 is raised. During actuation of third valve element 10, it is otherwise of advantage that a hard stop is formed between valve tappet 18 and base element 19.

Last but not least, the particularly good regulation behavior of the valve is also achieved on the basis of the spacings provided in the basic state between the first, second and third valve elements 8, 9, 10, since hereby the various fluidic states of valve 1 can be differentiated particularly well and simply activated. In the basic state, working port 5 of the valve is vented. When first valve element 8 has then been pushed so far that it bears sealingly on the area of contact with second valve element 9, thus forming a sealing seat 26 therewith, the state for holding a pressure present at working outlet 5 is attained, since in this position third valve element 10 separates working pressure chamber 24 from pressure supply chamber 29 by contact with the second sealing seat. Only when second valve element 9 has been brought by further displacement into contact with third valve element 10 and third valve element 10 has been lifted against its spring preload from second sealing seat 27 is the valve state for admission of air to working port 5 at the pressure supplied from pressure supply 6 attained.

Regulation of the described valve 1—despite the cascade-like configuration—proves otherwise to be particularly simple. For this purpose, it is possible to provide a magnetic element 30 on first valve element 8 (e.g. in the region of the diaphragm-disk rim), so that, by using a suitable magnetic position sensor 31, especially in the form of an AMR, GMR or TMR sensor, the axial position of first valve element 8 can be determined energy-efficiently and precisely. From this position it is possible to deduce the instantaneous valve state directly, without having to determine other measurable parameters for the purpose. By using a suitably precise position sensor, it is also then possible in particular to achieve fine regulation of valve 1 in the immediate vicinity of those positions at which the changeover between the various switched states of the valve takes place.

By virtue of the purely mechanical coupling of the three valve elements 8, 9 and 10 and because of the fixed travels, predetermined by the location of the sealing seats, between the various valve positions, it is therefore possible to achieve regulation of valve 1 by utilizing (exclusively) the (axial) position of first valve element 8 determined by means of position sensor 31, as will be further explained hereinafter on the basis of various characteristics of valve 1.

In the present case, pneumatic pilot valve 2 is configured as a proportional 3/2-way valve, while booster valve 3 is a 3/3-way valve.

Pilot valve 2 itself has a pressure inlet 33, which in the present case is fed with compressed air made available by pressure regulator 7. Furthermore, a pilot-valve vent port 32 (optionally in communication with vent port 4 of valve 1) is provided, as is a pilot-valve working outlet 34, which is fluidically in communication with control pressure chamber 15 of valve 1.

By means of a piezo-bending transducer 35, which can be electrically actuated and hereby swiveled in the region of its free end as indicated by double arrow B, pilot-valve working outlet 34 may now be optionally vented (i.e. placed fluidically in communication with pilot-valve vent port 32) or placed partly or completely in communication with the pressure prevailing at pressure inlet 33 of pilot valve 2. Thus pilot valve 2, by regulating the pressure prevailing in control pressure chamber 15, can be used with particularly high regulation quality and low energy consumption for actuation of first valve element 8 of valve 1.

Furthermore, a control unit 36 is provided, to which the measured signal of position sensor 31 is delivered via a signal line 37. Control unit 36, which controls pilot valve 2 (and therefore proportional valve 1 together), is set up to calculate the control voltage for pilot valve 2, needed to achieve a desired switched state of booster valve 3, and correspondingly to activate pilot valve 2 via control line 38, in which case the measured signal of the position sensor (as preferably the single measured parameter concerning the valve state) is evaluated during this calculation. In the process, therefore, firstly the instantaneous valve state is determined from the measured value representative of the position of first valve element 8 (by comparison with verification or calibration data saved appropriately in control unit 36) and then the control voltage for pilot valve 2 is regulated such that first valve element 8—depending on desired valve state—holds its axial position or changes it to change the valve state.

Figure 2:
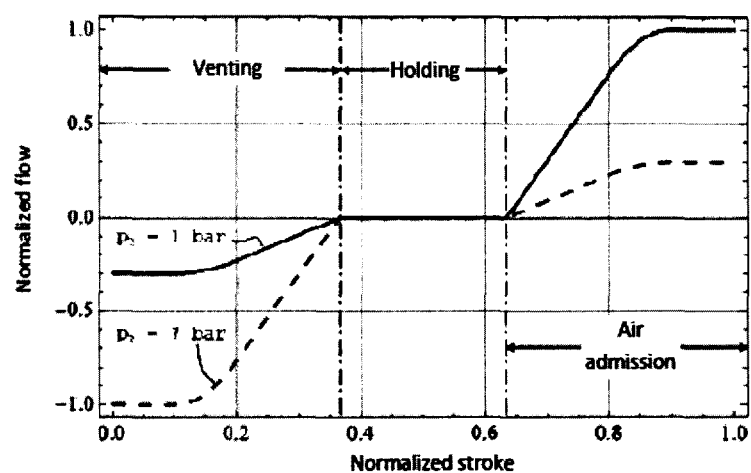
FIGS. 2-4 show three different diagrams of different characteristics of a valve to illustrate the complex relationships between various valve parameters.

FIG. 2 shows the flow characteristic of booster valve 3 at working port 5 as a function of its stroke (i.e. as a function of the axial position of the first valve element that can be determined by means of the position sensor). What are shown are two exemplary curves for various pressures p2 at the working port for a pressure of p1=8 bar at the pressure supply. In the process, the three valve positions are occupied in succession, i.e. the working port is vented (=negative flow), the pressure is held (=low flow) and air is admitted to the working port (=positive flow) in succession. The transition between the individual ranges is almost independent of the pressure at the working port. At worst, a (minimal) pressure dependence exists due to the pressure-dependent compression of the valve seats made of a polymer material, so that here only a marginal influence on the range transitions exists. In contrast to a power stage with slide design typically used in proportional valves, the valve geometry used in the present case permits greatly improved leak-tightness of the valve by forming two sealing seats, so that, in the holding range, the pressure at the working port can also be held for a long time.

Figure 3:
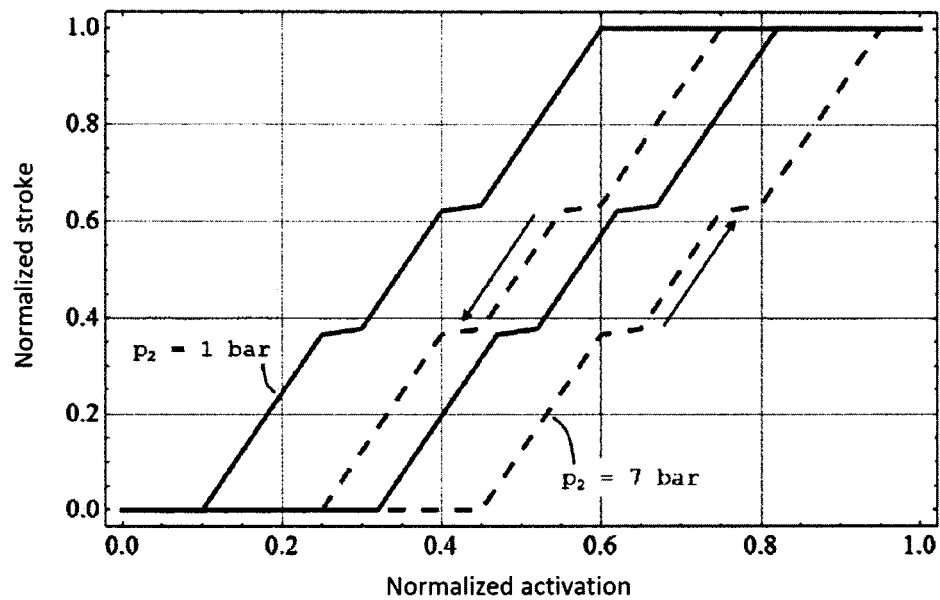

FIG. 3 now shows the stroke characteristic of the booster valve of a proportional valve as a function of the control voltage present at the pilot valve (respectively in normalized units) for two different working pressures p2=1 bar and p2=7 bar, where p1=8 bar represents the pressure supplied by pressure supply 6. This diagram reveals distinct hysteresis in the activation signal on the one hand and a strong dependence on the working pressure on the other hand.

The pressure dependence is due to the specific valve geometry, which causes the force counter to the direction of actuation of the valve to increase with the working pressure. At high working pressure, therefore, a correspondingly higher control pressure is necessary in order to actuate the booster valve than is the case at a lower working pressure. The hysteresis of the characteristic is caused by the piezoelectric and fluidic hysteresis of the pilot valve.

Figure 4:
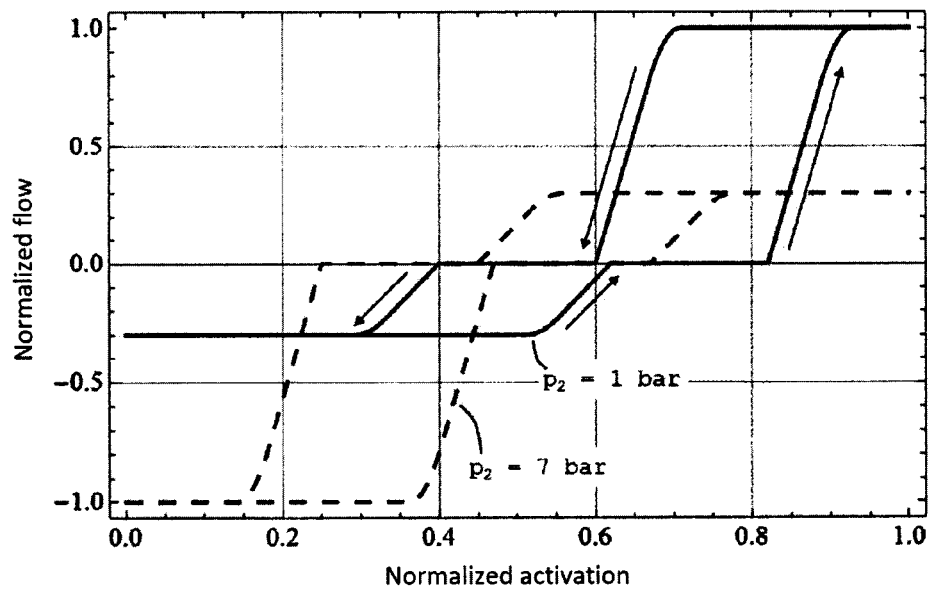

FIG. 4 shows the overall characteristic of the flow through the booster valve as a function of the activating voltage, once again for two different pressures p2=1 bar and p2=7 bar at the working port for a pressure of p1=8 bar at the pressure supply. Because of the hysteresis of the control voltage, the individual valve positions can no longer be attributed to an unambiguous activation range in the control signal. Clearly, this is further impaired by the pressure dependence.

The characteristics from FIGS. 3 and 4 therefore show that pressure-dependent regulation of such a proportional valve would be extremely problematic. In contrast, the characteristic from FIG. 2 illustrates that particularly simple valve regulation is permitted by utilization of the measured signal of the position sensor that characterizes the valve stroke.

What is claimed is:

1. A proportional valve (1) with a pilot valve (2) that can be activated by a control signal and a booster valve (3) that can be actuated by means of the pilot valve (2), wherein the proportional valve (1) has a compressed-air port (6) for connection of a compressed-air supply, a working port (5) and a vent port (4), wherein the booster valve (3) has three valve elements (8, 9, 10) connected in series and respectively movable in an axial direction against a spring force, namely a first valve element (8) actuated by the pilot valve (2), a second valve element (9), which is actuated by the first valve element (2), and a third valve element (10), which is actuated by the second valve element (9), wherein, in a basic position of the proportional valve (1), the first, the second and the third valve elements (8, 9, 10) are spaced apart from one another in pairs and, within the booster valve (3), a first sealing seat (26) acting between the first valve element (8) and the second valve element (9) and a second sealing seat (27) acting between the third valve element (10) and the housing (16) are formed and disposed in such a way that during variation of the control signal that activates the pilot valve (2) and of the resulting cascade-like positioning of the axial positions of the first, second and third valve elements (8, 9, 10), various switched states can be set for venting of and air admission to the working port (5) and for holding a pressure present at the working port (5), wherein further a position sensor (31) is provided to detect the axial position of the first valve element (8) and a control unit (36) of the proportional valve (1) is set up in such a way that the measured signal of the position sensor (31) is evaluated for calculation of the control signal for the pilot valve (2), needed in order to achieve a desired switched state of the booster valve (3).

2. The proportional valve of claim 1, wherein the position sensor (31) is set up for contactless measurement of the axial position of the first valve element.

3. The proportional valve of claim 2, wherein the position sensor (31) is based on an optical, capacitive or magnetic measurement principle.

4. The proportional valve of claim 3, wherein the position sensor (31) is a magnetic-field angle sensor.

5. The proportional valve of claim 4, wherein the position sensor (31) is an AMR, TMR or GMR sensor.

6. The proportional valve of claim 1, wherein the control unit (36) of the proportional valve (1) is set up in such a way that the control signal for the pilot valve (2), needed in order to achieve a desired switched state of the booster valve (3), is calculated by utilizing exclusively the measured signal of the position sensor (31).

7. The proportional valve of claim 1, wherein the first valve element (8) is formed by a diaphragm disk (11) with a diaphragm-disk shank (12) that extends in axial direction and is provided with an axial bore (13), wherein the second valve element (9) is formed by a valve tappet (18), which is spring-preloaded in a direction pointed toward the diaphragm disk (11) and is provided on an end face pointing toward the diaphragm-disk shank (12) with a first sealing seat for the free end of the diaphragm-disk shaft (12), which can be brought into contact therewith, and wherein the third valve element (10) is formed by a base element (19), which is spring-preloaded against a second sealing seat in a direction pointing toward the valve tappet (18) and can be lifted from the second sealing seat by axial displacement of the valve tappet (18) that has been brought into contact on the base element (19).

8. The proportional valve of claim 7, wherein the position sensor (31) interacts with a magnetic element (30) integrated in the diaphragm disk (11).

9. The proportional valve of claim 1, wherein a surface (25, 28) forming the first and/or second sealing seat and/or interacting therewith for fine regulation of the fluid flow is made of a polymer material.

10. The proportional valve of claim 1, wherein the pilot valve is a 3/2-way valve.

11. The proportional valve of claim 1, wherein the booster valve is a 3/3-way valve.

* * * * *